United States Patent [19]
Civanlar et al.

[11] Patent Number: 5,737,333
[45] Date of Patent: Apr. 7, 1998

[54] METHOD AND APPARATUS FOR INTERCONNECTING ATM-ATTACHED HOSTS WITH TELEPHONE-NETWORK ATTACHED HOSTS

[75] Inventors: Seyhan Civanlar, Middletown Township, Monmouth County; Vikram R. Saksena, Freehold, both of N.J.

[73] Assignees: Lucent Technologies Inc., Murray Hill; AT&T Corp., Middletown, both of N.J.

[21] Appl. No.: 494,121

[22] Filed: Jun. 23, 1995

[51] Int. Cl.$^6$ .................................................. H04Q 11/04
[52] U.S. Cl. ...................................... 370/352; 370/395
[58] Field of Search ................................ 370/60.1, 85.13, 370/60, 94.1, 79, 352, 401, 402, 403, 422, 437, 465; 379/207, 269; 340/825.52

[56] References Cited

U.S. PATENT DOCUMENTS

| | | | |
|---|---|---|---|
| 4,897,874 | 1/1990 | Lidinsky et al. | 380/3 |
| 5,440,547 | 8/1995 | Easki et al. | 370/60.1 |
| 5,483,527 | 1/1996 | Doshi et al. | 370/60.1 |
| 5,544,163 | 8/1996 | Madonna | 370/60.1 |
| 5,544,164 | 8/1996 | Baran | 370/60.1 |

*Primary Examiner*—Douglas W. Olms
*Assistant Examiner*—Shick Hom
*Attorney, Agent, or Firm*—Eugene J. Rosenthal

[57] ABSTRACT

Communication, for example, via the internet protocol (IP), is facilitated among ATM-attached, LAN-attached and telephone-network-attached hosts, by a so-called "RouTel" and an address server. The RouTel provides gateway capabilities for connecting a) the telephone network, e.g., via 1) integrated services digital network basic rate interface (ISDN BRI), 2) ISDN primary rate interface (ISDN PRI), or 3) modem interfaces, and b) an ATM network, via one or more ATM interfaces. Optionally, the RouTel provides interfaces for directly attaching legacy LANs, e.g., Ethernet, FDDI, and Token Ring. More particularly, the RouTel can perform IP packet forwarding between 1) a telephone-network-attached host and an ATM-attached host; 2) two telephone-network-attached hosts; and 3) a telephone-network-attached host and a legacy LAN-attached host.

23 Claims, 5 Drawing Sheets

METHOD AND APPARATUS FOR INTERCONNECTING ATM-ATTACHED HOSTS WITH TELEPHONE-NETWORK ATTACHED HOSTS

TECHNICAL FIELD

This invention relates to interconnecting hosts that have different interfaces and which may move around in a network and/or change their interface.

BACKGROUND OF THE INVENTION

Currently, multimedia service users, especially households and small businesses, use dial-up connections, typically using a modem, to obtain services from a multimedia server. The dial-up connections are commonly point-to-point and can run data protocols such as internet protocol (IP). In fact, a defacto-standard encapsulation of IP over serial lines, such as a dial-up telephone line, known as serial line internet protocol (SLIP) has been standardized in RFC 1055, "A Nonstandard For Transmission of IP Datagrams Over Serial Lines, SLIP", June 1988. SLIP has been very popular within the Internet community, allowing small users to dial an Internet server to access services provided by the Internet. As integrated services digital network basic rate interface (ISDN BRI), and ISDN primary rate interface (ISDN PRI) rates become ubiquitous, SLIP is gaining popularity for use on such higher rate serial lines.

While small remote users and households rely on SLIP or other similar serial line protocols, user groups clustered together use data networks based on IEEE 802 local area networks, i.e., so called legacy LANs. Legacy LANs are different than serial lines, as the LAN medium is "connectionless", i.e., hosts on the LAN exchange message information without building connections. Many existing applications which are based on IP, for example, run on legacy LAN protocols such as the medium access control (MAC) protocol. It is well known in the art that MAC is a layer-2 and IP is a layer-3 protocol according to international standards organization (ISO) seven layer reference model.

As asynchronous transfer mode (ATM) becomes more widely accepted, new standards have emerged to define the interworking of hosts on legacy LANs and ATM networks. One such standard is known as LAN emulation (LANE), and it defines, in the ATM Forum version 1.0 LAN Emulation UNI specifications (LUNI), the interface between a) ATM-attached hosts and bridges, which are known as LAN emulation client (LEC) hosts, and b) LAN emulation servers. LANE is a bridging solution which allows legacy-LAN-attached hosts to transparently communicate with ATM-attached hosts using the LAN emulation services offered by a) a LAN emulation configuration server (LECS), b) a LAN emulation server (LES), and c) a broadcast and unknown server (BUS).

The LANE solution provides a new way of networking between IEEE 802 LAN attached hosts and ATM-attached hosts, but it does not consider hosts that are connected to the telephony network through modems or ISDN adapters communicating with hosts that are attached to the ATM network or the legacy networks. Note that ATM-attached hosts do not have conventional telephone numbers, and so cannot be dialed by telephone network-attached hosts. On the other hand, protocols such as SLIP define how two telephone network connected hosts can communicate using data protocols such as IP, but does not consider the problem of interworking with other lower layer protocols, such as MAC and ATM.

SUMMARY OF THE INVENTION

When protocols such as SLIP, MAC and ATM are all used within a network, mechanisms are needed to translate between the hosts' a) telephone numbers, b) IP addresses, and c) MAC and ATM addresses, in order to 1) locate destinations, 2) build connections and 3) forward packets in the mixed environment. No such device or protocols for enabling telephone-network-attached and ATM-and LAN-attached hosts to transparently communicate are defined or suggested in the prior art. Such a device should enable translation between ATM, MAC, and Serial Line protocols. Also, services are required in the network for a) address translation, and b) broadcast and multicast functions.

The foregoing communications needs are provided for, in accordance with the principles of the invention, by employing a system including 1) a so-called "RouTel", and 2) an address server, networked together. The networked system, which may also include 3) an optional broadcast server and 4) an optional RouTel database, allows ATM-attached, LAN-attached and telephone-network-attached (TNA) hosts to communicate with each other, for example, via the internet protocol (IP). The RouTel provides gateway capabilities for connecting a) the telephone network, e.g., via 1) integrated services digital network basic rate interfaces (ISDN BRI), 2) ISDN Primary Rate Interfaces (ISDN PRI), or 3) modem interfaces, and b) an ATM network, via one or more ATM interfaces. Optionally, the RouTel provides interfaces for directly attaching legacy LANs, e.g., Ethernet, FDDI, and Token Ring.

An IP host attached to the telephone network dials the RouTel and builds a connection to the RouTel via a protocol, such as serial line interface protocol (SLIP), over the telephone network. Once the RouTel detects the IP host's connection, it updates the database of an address server attached to the ATM network regarding the binding between the IP address of the telephone-network-attached IP host and the RouTel's ATM address. Optionally, other addresses and registration information, such as the name and billing address of the IP host, are also updated. In one embodiment of the invention, the RouTel, the ATM-attached hosts, and the address server use RFC-1577 and it's extensions for address update and query, to communicate among themselves.

An IP host may discover the address of an available RouTel to connect itself to by querying a RouTel database, which is located at a telephone number known by all IP hosts. The IP host connects to the RouTel database, e.g., via a modem, and obtains one or more telephone numbers for the nearest available RouTel. The IP host can then call the selected RouTel and join the network. Advantageously, this process does not require an IP host to change it's IP address as it moves around the network since the RouTel to which it connects can identify the connecting host's IP address and transmits a message to the address server to update the IP address-to-ATM address binding.

The RouTel can perform IP packet forwarding between 1) a telephone-network-attached host and an ATM-attached host; 2) two telephone-network-attached hosts, and 3) any host connected to a RouTel and a legacy LAN-attached host.

An optional broadcast server can be used to forward multicast and broadcast packet within the ATM network. The broadcast/multicast packets received by the RouTel are appropriately distributed to telephone-network-attached hosts that connect to itself.

The RouTel itself can initiate a call to a telephone-network-attached host if the host is not connected, and when the call is accepted the RouTel can forward IP packets to the host.

DETAILED DESCRIPTION

Figure 1:
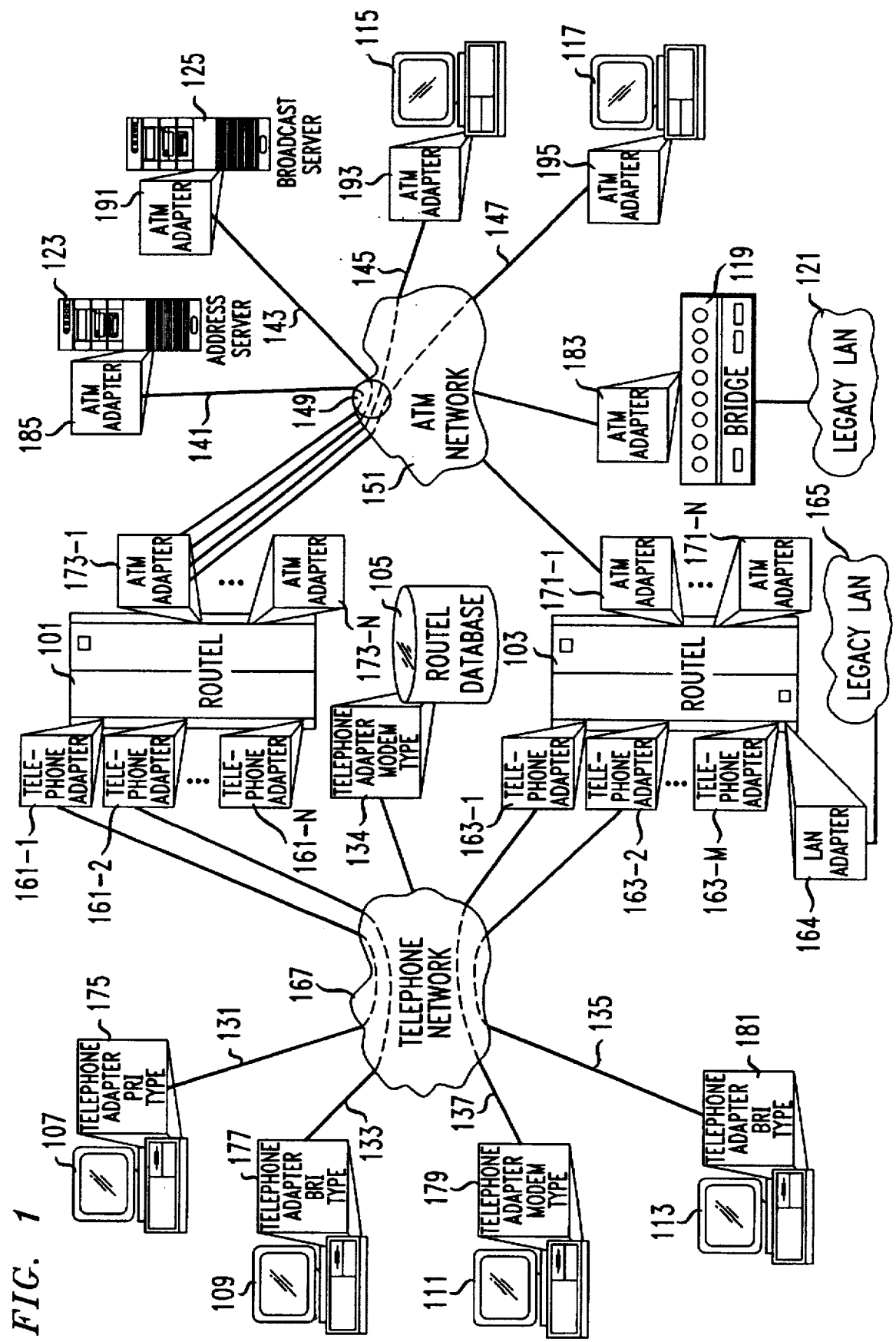
FIG. 1 shows an exemplary embodiment of the invention in which RouTels are arranged for interconnecting a) telephone-network-attached (TNA) hosts, b) ATM-attached hosts, and c) LAN-attached hosts in a legacy LAN, in accordance with the principles of the invention.

FIG. 1 shows an exemplary embodiment of the invention in which RouTels 101 and 103 are arranged for interconnecting a) telephone-network-attached (TNA) hosts 107, 109, 111 and 113, b) ATM-attached hosts 115, 117, and 119, and c) LAN-attached hosts in legacy LAN 165, in accordance with the principles of the invention.

Each TNA-host has an adapter to connect it to telephone network 167. Such adapters include 1) ISDN PRI adapters, 2) ISDN BRI adapters, and 3) modems. Adapter 175 is an ISDN PRI adapter which resides on TNA-host 107 and connects host 107 to telephone network 167. Adapter 177 is an ISDN BRI adapter which resides on TNA-host 109 and connects to telephone network 167. Similarly, adapters 179 and 181 are a modem adapter and an ISDN BRI adapter, respectively, connecting hosts 111 and 113 to telephone network 167. Each adapter presents itself to telephone network 167 as being located at its own telephone number.

RouTel 101 contains TNA adapters 161, including TNA adapters 161-1 through 161-N, which are configurable to any of ISDN BRI, ISDN PRI or modem type. RouTel 103 contains TNA adapters 163, including TNA adapters 163-1 through 163-M, which are configurable to any of ISDN BRI, ISDN PRI or modem type. Adapters 161 and 163 are directly connected to telephone network 167. Each adapter 161 or 163 on RouTel 101 or RouTel 103 can have a different telephone number, or a group of the adapters may share the same telephone number. RouTel 101 can open a communication channel with a TNA-host by dialing that host's telephone number to set up a bi-directional circuit-switched circuit. Similarly, TNA-hosts 107, 109, 111 and 113 can open a communication channel with RouTel 101 by dialing RouTel 101's telephone number to set up a bi-directional circuit-switched circuit.

RouTel 101 also contains at least one ATM adapter 173. ATM adapter 173 allows RouTel 101 to build connection-oriented ATM connections 145 and 147 to ATM-attached hosts 115 and 117 via ATM links. Connection 145 traverses ATM network 151 and terminates on the ATM adapter 193 of host 115. Similarly, connection 147 terminates on ATM adapter 195 of host 117. Optionally, RouTel 101 can have adapters, such as LAN adapter 164, to directly attach legacy LANs, e.g., legacy LAN 165.

RouTels 101 and 103 can connect to address server 123, and optionally, to broadcast server 125. For example, RouTel 101 connects to address server 123 and broadcast server 125 via connection-oriented ATM connections 141 and 143 respectively, both of which traverse ATM network 151. In the example of FIG. 1, connections 143, 145, 147, and 149 are switched at ATM switch 149 within ATM network 151.

Optionally, RouTels 101 and 103 are connected to RouTel database 105, which is connected to the telephone network by way of modem 194. RouTel database 105 contains a copy of the information relating to the telephone network adapters of all of the RouTels. For example, RouTel 101 can dial RouTel database 105 and build a connection thereto when it is ready to send database updates. At such a time, RouTel 101 informs RouTel database 105 of a) it's geographical area, e.g., NY, NJ, CA, etc., b) the available telephone numbers that a TNA-attached host can use to connect to that RouTel, and c) the type of connection, e.g., BRI, PRI or 14.4 Kbps modem, that each telephone number supports.

Each TNA-attached host can dial into RouTel database 105, which is at a globally-known telephone number, to determine to which RouTel to connect. This may be necessary when a TNA-host is new in the network or when one has relocated within the network, e.g., when the host changes office or travels.

For clarity of exposition, the following assumes that an internet protocol (IP) application runs on all hosts in the network which communicate by sending and receiving IP data packets. The preference for IP over other protocols results from the fact that the IP protocol family (TCP, UDP, HTTP, etc.) runs over a variety of network media such as 1) IEEE 802.3 (Ethernet), 2) 802.5 (Token Ring), 3) ATM, 4) X.25, and 5) point-to-point serial lines, such as telephone lines. Also, there are standard encapsulation methods for IP packets defined for many such networks. For example, RFC-1055 defines a protocol called serial line internet protocol (SLIP) which allows IP to run over telephone lines. Similarly, RFC 1483 defines protocols by which IP can run over ATM lines; either a) directly or b) over medium access control (MAC) layer for LAN emulation. Note however, that as used herein, IP is merely an example. Other protocols can also use the system disclosed herein.

In accordance with the principles of the invention, a key function of RouTels 101 and 103 is to enable communications among 1) TNA-attached hosts, 2) ATM-attached hosts and 3) LAN-attached hosts. Various media, address translation, and packet forwarding functions of RouTel 101 are shown in Table 1.

TABLE 1

| FROM | TO |
| --- | --- |
| SLIP | ATM |
| SLIP | SLIP |
| ATM | SLIP |
| ATM | ATM (optional) |
| SLIP | MAC (optional) |
| MAC | SLIP (optional) |
| MAC | ATM (optional) |
| ATM | MAC (optional) |
| MAC | MAC (optional) |

The following describes scenarios in which RouTel transmits a first packet on a point-to-point (unicast) basis. Once the connections are established, of course, more than one packet may be transmitted.

1. TNA-host 107 sends an IP packet to ATM-attached host 115: In this case,

Host 107 dials RouTel 101, establishes a connection, and sends the IP packet using SLIP.

RouTel 101 receives the IP packet and determines that the destination address is host 115. This functionality requires RouTel 101 to perform layer-3 address header reading.

RouTel 101 either knows the ATM address of host 115, in which case it builds an ATM connection to host 115 and forwards thereto the IP packets using RFC 1483 encapsulation. Alternatively, if RouTel 101 does not know the ATM address, it requests address server 123 to send the ATM address corresponding to host 115. (An ARP message, per RFC-1577, can be used for this purpose.) Address server 123 sends the ATM address corresponding to host 115 to RouTel 101.

RouTel 101 builds an ATM connection to host 115 and forwards the IP packet using RFC 1483 encapsulation.

Optionally, address server 123 may send an address resolution request to all ATM-attached devices, which includes RouTel 101 and 103, and bridge 119, if the requested address is not in it's database.

2. TNA-host 107 sends an IP packet to host 109 connected to RouTel 101:

Host 107 dials RouTel 101, establishes a connection, and sends the IP packet using SLIP.

RouTel 101 receives the IP packet and determines that the IP destination address is host 109. This functionality requires RouTel 101 to perform layer-3 address header reading.

RouTel 101 definitely knows the telephone number of host 109, since it is connected to RouTel 101. RouTel 101 dials host 109's number, builds a connection to it, and forwards the IP packet using SLIP.

3. TNA-host 107 sends an IP packet to host 113 connected to RouTel 103:

Host 107 dials RouTel 101, establishes a connection, and sends the IP packets using SLIP.

RouTel 101 receives the IP packet and determines that the IP destination address is host 113. This functionality requires RouTel 101 to perform layer-3 address header reading.

RouTel 101 may know that it can reach host 113 through RouTel 103. If so, it builds an ATM connection to RouTel 103, encapsulates the IP packets using RFC 1483, and sends the packet to RouTel 103. In turn, RouTel 103 dials host 113, and forwards the packet using SLIP on this connection.

If RouTel 101 does not know how to reach host 113, it builds a connection to address server 123, and requests the ATM address of host 113. In response, address server 123 returns the ATM address of RouTel 103. The process continues as described above.

Optionally host 107 can send a data packet directly to host 113, if it knows the telephone number of host 113. Host 107 can obtain the telephone number of host 113 directly from address server 123.

4. TNA-host 107 sends an IP packet to a host on LAN 121:

This case is similar to case 1, with the exception that RouTel 101 builds an ATM connection to bridge 119, which in turn sends the IP packet to the LAN destinations by using a MAC layer protocol.

5. ATM-attached host 115 sends a packet to TNA-host 107:

If host 115 knows that host 107 is reachable through ATM address of RouTel 101, it builds a connection to RouTel 101, and sends the packet over the ATM connection. In turn, RouTel 101 forwards the packet to host 107 by dialing the host and building a connection to it.

RouTel 101 maintains a database of all it's adapters, including information about the TNA-attached hosts thereto. The database contains, for each RouTel adapter, (1) the RouTel adapter identifier type, 2) the RouTel adapter type, 3) the RouTel adapter telephone number, 4) the telephone number of the TNA-attached host to which the adapter is connected, (5) the IP address of the TNA-attached host, and (6) optionally, the host's name and address for billing. When the usage of any of it's adapters changes, RouTel 101 informs RouTel database 105. RouTel 101 may also learn from address server 123 the information necessary to reach other destinations and, optionally, it may store these addresses as well. An exemplary database of RouTel 101, organized with respect to adapters, is shown in Table 2.

TABLE 2

| Adapter | Adapter Type | Adapter Telephone | Host Telephone # | Host IP Address | Host Name /Address (Optional) |
|---------|--------------|-------------------|------------------|-----------------|-------------------------------|
| 161-1   | ISDN PRI     | 908 949 0011      | 908 949 0969     | 135.16.12.101   | Ruby                          |
| 161-2   | ISDN BRI     | 908 949 0012      | 908 741 2391     | 192.34.90.2     | Curie                         |
| ⋮       | ⋮            | ⋮                 |                  |                 |                               |
| 161-N   | Modem        | 908 949 0018      | None             | None            | None                          |

A RouTel may optionally keeps a cache of various addresses of all hosts connected to itself including their MAC, IP, ATM and telephone numbers.

When a new host connects to RouTel 101, it may request a new IP address, in which case RouTel 101 assigns an unused IP address to the host and informs the host of the new IP address. RouTel 101 then updates it's own database. RouTel 101 also informs address server 123 of the new IP address and it's binding to RouTel 101's ATM address. When a host changes its connection from one TNA to another, it can keep it's present IP address. The first time the IP host connects to another port of the RouTel or another RouTel, the RouTel with which the host established the new connection is responsible for sending a message to address server 123 to modify the address database. Address server 123 responds to such a message by updating it's database accordingly. When a new host connects to an adapter of RouTel 101, or disconnects therefrom, RouTel 101 sends a database update message to RouTel database 105 informing it of the status change.

Address server 123 is a repository of all address information in the network. It accepts address updates from ATM-attached devices, namely the RouTel's, ATM-attached hosts and ATM-attached bridge/routers. Address server 123 contains address (reachability) information relating the various addresses of each host in the network. The types of addresses a host can have includes: 1) an IP address or other layer-3 address, 2) an ATM address, 3) an optional MAC address or other layer-2 address, 4) an optional telephone number, 5) an optional name and address for billing purposes. An exemplary database for address server 123 is shown in Table 3.

TABLE 3

| IP Address | ATM Address | MAC Address | Telephone Number | Name | Billing Address |
| --- | --- | --- | --- | --- | --- |
| IP 107 | ATM-101 | — | Tel-107 | ruby.att.com | |
| IP 113 | ATM-103 | — | Tel-113 | curie.att.com | |
| IP 115 | ATM-115 | — | — | kleo.att.com | |
| IP-101 | ATM-173-1 | — | Tel-161-1 | route1101.att.com | 101 Crawfords Corner Road, Holmdel, NJ 07733 |
| IP-101 | ATM-173-2 | — | Tel-161-2 | route1101.att.com | |
| IP-101 | ATM-173-3 | — | Tel-161-N | route1101.att.com | |
| IP-119 | ATM-119 | MAC-119 | — | | |
| IP-103 | ATM-171-1 | — | Tel-163-1 | route1103.att.com | 600 Mountain Avenue, Murray Hill, NJ 07974 |
| IP-103 | ATM-171-2 | — | Tel-163-2 | route1103.att.com | |
| IP-103 | ATM-171-3 | — | Tel-163-M | route1103.att.com | |

Address server 123 contains the address information for all hosts in it's domain. A domain is a collection of RouTels and ATM hosts. For those hosts which are in the domain of address server 123, at least one default router's address is maintained in the address server's database. If address server 123 can not find the requested address in it's database, indicating that the requested address is out of the domain, it may optionally respond with the ATM address of a router. The router can be ATM-attached, or it can be connected to a legacy LAN, e.g., legacy LAN 121 or 165. When a host forwards packets to the router, the router will in turn forward it to other networks (not shown) using methods well known in the prior art.

Address server 123 enables all hosts in the network to view its address database. Access to address server 123 is provided for TNA-hosts via the telephone network and via the ATM network for ATM-attached hosts. Also, ATM-attached hosts can send address queries to address server 123 for address translation, usually from a Layer-3 address, such as IP, to ATM, or the reverse. TNA-hosts can obtain the telephone numbers of other hosts in the network from address server 123. Using the obtained address, TNA-hosts can build direct connections between themselves rather than establishing connections via RouTels. Address server 123 may reside at an ATM address and a telephone number known to all hosts and RouTels in address server 123's domain. Alternatively, the address of address server 123 may be provided to hosts and RouTels by a human operator, or electronically by an ATM switch.

Optional broadcast server 125 provides ATM multicast and broadcast capabilities for ATM-attached hosts. Broadcast server 125 maintains connections with all ATM-attached hosts in the network to receive therefrom broadcast packets and to then forward such packets to all hosts. An ATM-attached host which has packets for broadcast or multicast forwards these packets to broadcast server 125, which in turn broadcasts or multicasts them to all ATM destinations. If a broadcast or multicast packet is received by a RouTel, it forwards the packet to all TNA-hosts in the destination list, in accordance with an aspect of the invention.

Figure 2:
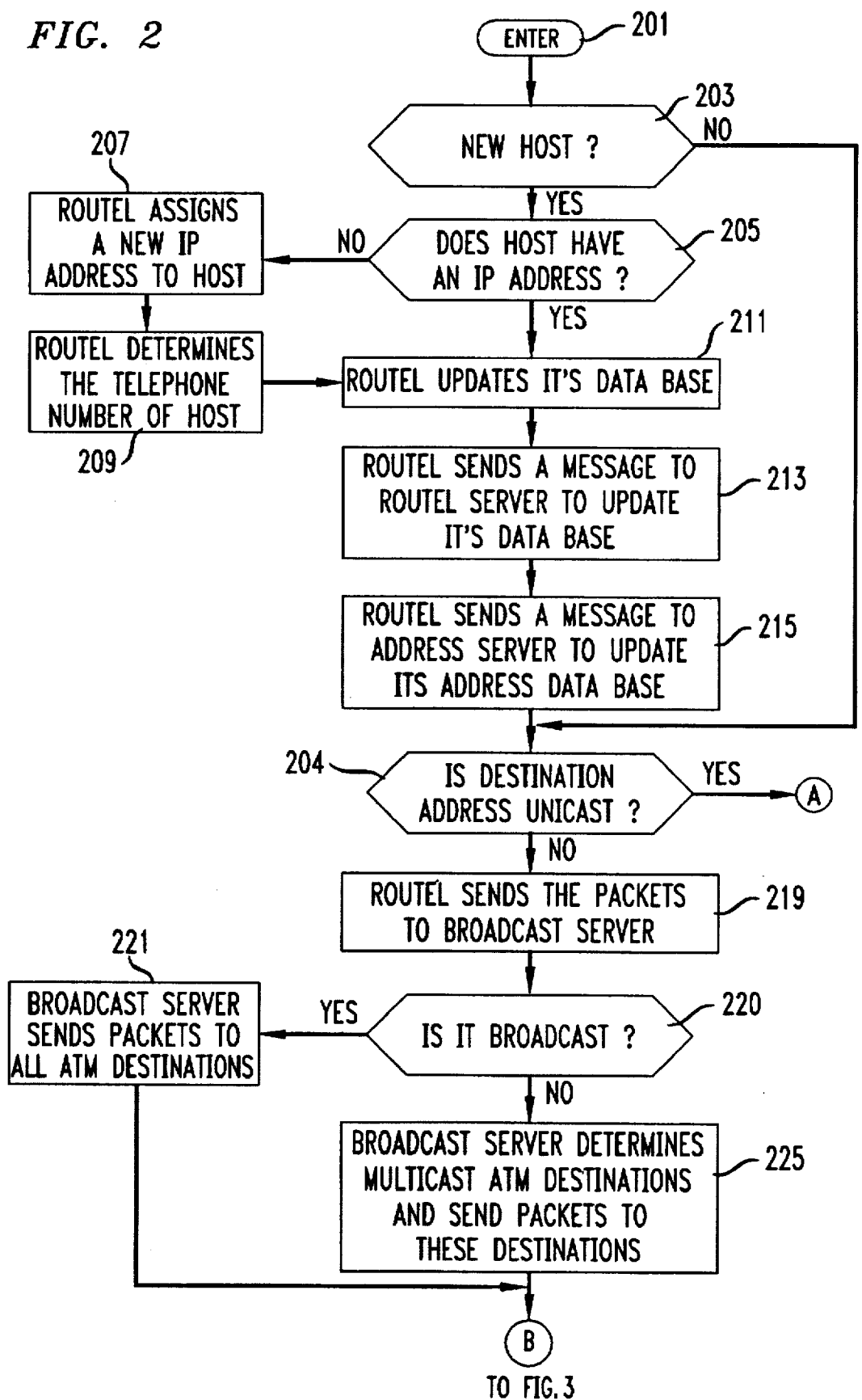
FIGS. 2 and 3, when connected together, shown an exemplary procedure for use by a telephone-network-attached (TNA) host in sending packets to other hosts in an ATM network, a telephone network or a legacy LAN.
Figure 3:
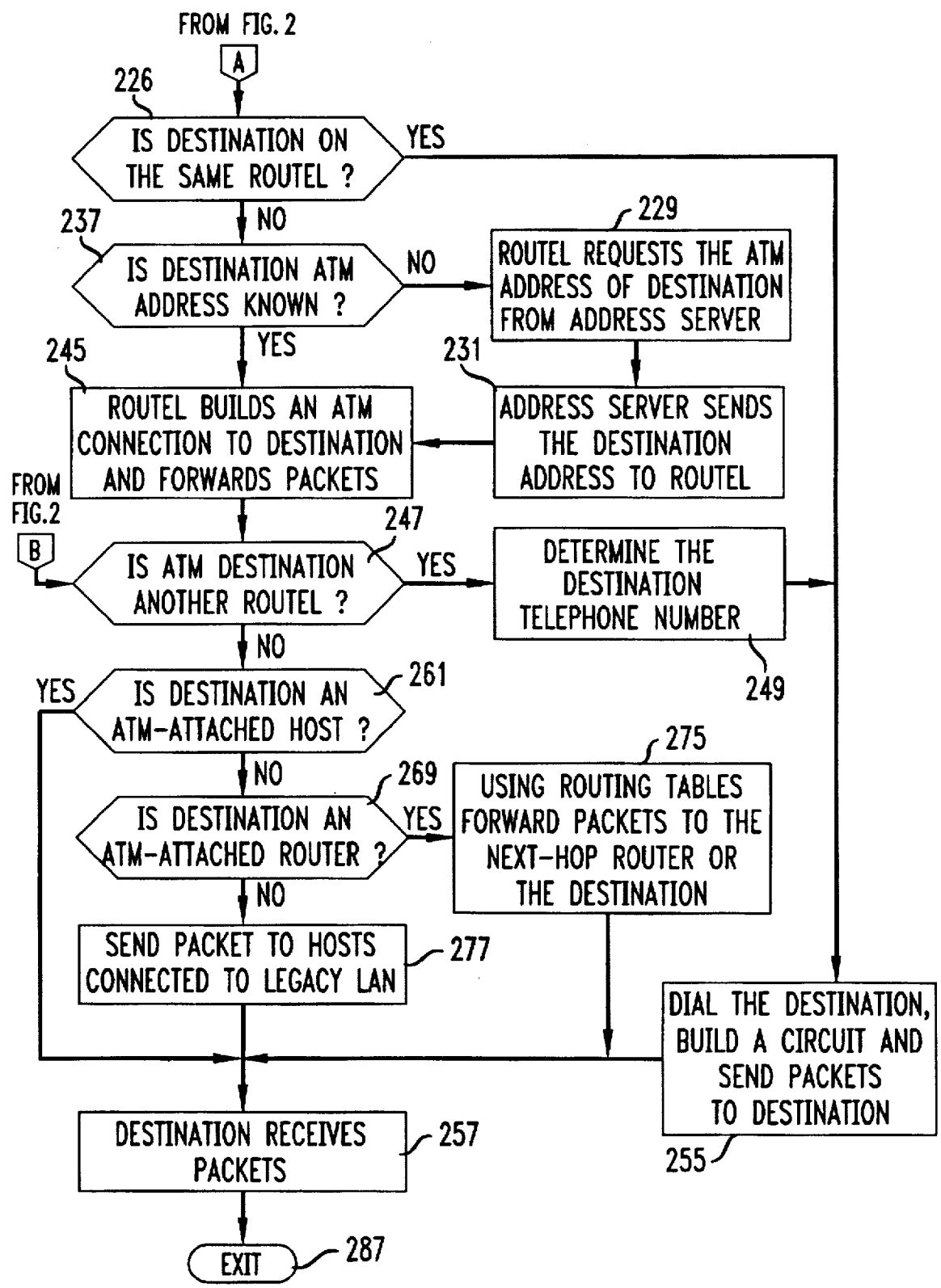

FIGS. 2 and 3, when connected together, shown an exemplary procedure for use by a telephone-network-attached (TNA) host in sending packets to other hosts in ATM network 151 (FIG. 1), telephone network 167 or legacy LAN 121. The process is entered in step 201 (FIG. 2), when a telephone-network-attached host dials RouTel 101 and establishes a connection to it for transmitting data packets.

In conditional branch point 203, RouTel 101 tests to determine if the particular host is a new host. If the test result in step 203 is YES, indicating that this is a new host, control passes to conditional branch point 205, in which the RouTel tests to determine if the new host already has a layer-3 address, e.g., an IP address. If the test result in step 205 is YES, indicating that the host already has an IP address, and thus is not requesting a new address, control passes to step 211.

If the test result in step 205 is NO, indicating that the host does not have an IP address, and therefore requires a new IP address, control passes to step 207, in which RouTel 101 a) determines a new address for the host, and b) sends the new address to the host over the connection that has been established by the host. Next, in step 209, RouTel 101 determines the telephone number of the new host to update it's database. The telephone number of the host can be determined by using a feature such as "Caller-ID", which is well known in the art, or optionally, by RouTel 101 being sent the telephone number from the new host itself in response to a packet requesting it. Thereafter, control passes to step 211.

In step 211, RouTel 101 updates it's database to reflect that a new host has been connected to one of it's adapters 161, and that this adapter is no longer available for use by other hosts. Also, RouTel 101 registers the telephone number associated with the IP address of the port and the adapter to which the new host is connected. By doing so, when a packet arrives destined for the particular IP host, RouTel 101 will know to which of it's adapters to route the packet, and which telephone number to dial to reach the host, in accordance with an aspect of the invention.

Next, control passes to step 213, in which RouTel 101 sends an update message to RouTel database 105, to ensure that RouTel database 105 accurately reflects that the particular adapter 161 is now occupied by a new host. Next, in step 215, RouTel sends a message to address server 123 to update its address database to reflect the new address. The message includes the new host's 1) IP address, 2) ATM address, and 3) telephone number. The ATM address that RouTel 101 sends to address server 123 is one of the ATM addresses of RouTel 101 itself, since ATM-attached hosts reach the new host by establishing an ATM connection to RouTel 101. RouTel 101 then forwards the packet received from it's ATM interface to the appropriate telephone adapter for transmission to the telephone-network attached host, in accordance with the principles of the invention.

After completion of step 215, or if the test result in step 203 is NO, control passes to conditional branch point 204.

In conditional branch point 204, RouTel 101 tests to determine if the destination address of the data packet is a unicast destination address. If the test result in step 204 is NO, indicating that the packets are destined either to a multicast or a broadcast address, control passes to step 219, in which RouTel 101 forwards the packet to broadcast server 125. Next, control passes to optional conditional branch point 220, in which broadcast server 125 tests to determine if the packets are destined for a broadcast address. If the test result in step 220 is YES, indicating that the packet is a broadcast packet destined to all ATM destinations, control passes to step 221, in which broadcast server 125 broadcasts the packets to all ATM-attached devices. Control passes to step 247, and process continues as described herein below.

If the test result in step 220 is NO, indicating that the packet is a multicast packet that is destined to several specific ATM destinations, control passes to step 225, in which broadcast server 125 determines the destination ATM addresses. The destination ATM addresses are determined by broadcast server 125 in collaboration with address server 123. Broadcast server 125 then forwards copies of the packet only to these destinations. Control then passes to step 247, and process continues as described below.

If the test result in step 204 is YES, indicating that the destination address is a unicast address, control passes to conditional branch point 226, in which RouTel 101 tests to determine if the destination layer-3 address is located within RouTel 101. If the test result in step 225 is YES, indicating that the host specified by the destination address is connected to RouTel 101 and it is a telephone-attached host, control passes to step 255, in which RouTel 101 a) dials the destination host, b) builds a connection and c) sends the packet. Next, the packet is received in step 257 by the destination host, and process is exited in step 287.

If the test result in step 226 is NO, indicating that the host is not connected to RouTel 101, control passes to step 237, in which RouTel 101 tests to determine if it knows the ATM address of the destination. If the test result is step 237 is YES, indicating that RouTel 101 knows the destination ATM address, control passes to step 245, in which RouTel 101 builds an ATM connection to the destination and sends the packet.

If the test result in step 237 is NO, indicating that RouTel 101 does not know the ATM address of destination, control passes to step 229, in which RouTel 101 sends an address translation request to address server 123 asking for the ATM address corresponding to a layer-3, e.g., IP, address. Next, control passes to step 231, in which address server 123 determines the requested ATM address from it's database and sends the address as a response to RouTel 101. Thereafter, in step 245, RouTel builds an ATM connection to the destination host and sends the packets.

Upon completion of step 245, control passes to step 247, in which the ATM destination tests to determine if the final destination is a telephone-network-attached host connected to the destination RouTel. If the test result in step 247 is YES, control passes to step 249, in which the destination RouTel determines the telephone number of the destination host from it's database. The process then continues in step 255, as described above.

If the test result in step 247 is NO, indicating that the destination ATM device is not another RouTel, control passes to conditional branch point 261, in which the ATM destination tests to determine if it is the final destination. If the test result is YES, control passes to step 257 in which the destination ATM host receives the packet, and the process is exited in step 287.

If the test result in step 261 is NO, indicating that the ATM-attached host is either an ATM-attached router or bridge but not the final destination, control passes to conditional branch point 269, in which the ATM-attached device tests to determine if the packet is targeted for another destination, and it received the packets as a router. If the test result in step 269 is YES, control passes to step 275, and the ATM-attached router uses it's routing tables to route the packets to the next router or the final destination. These destinations can also be ATM-attached or other protocol-attached.

If the test result in step 269 is NO, indicating that the ATM-attached device received the packet as a bridge, control passes to step 277. In step 277, the bridge sends the packets to all it's legacy hosts. Control passes to step 257 and process continues as described above.

Figure 4:
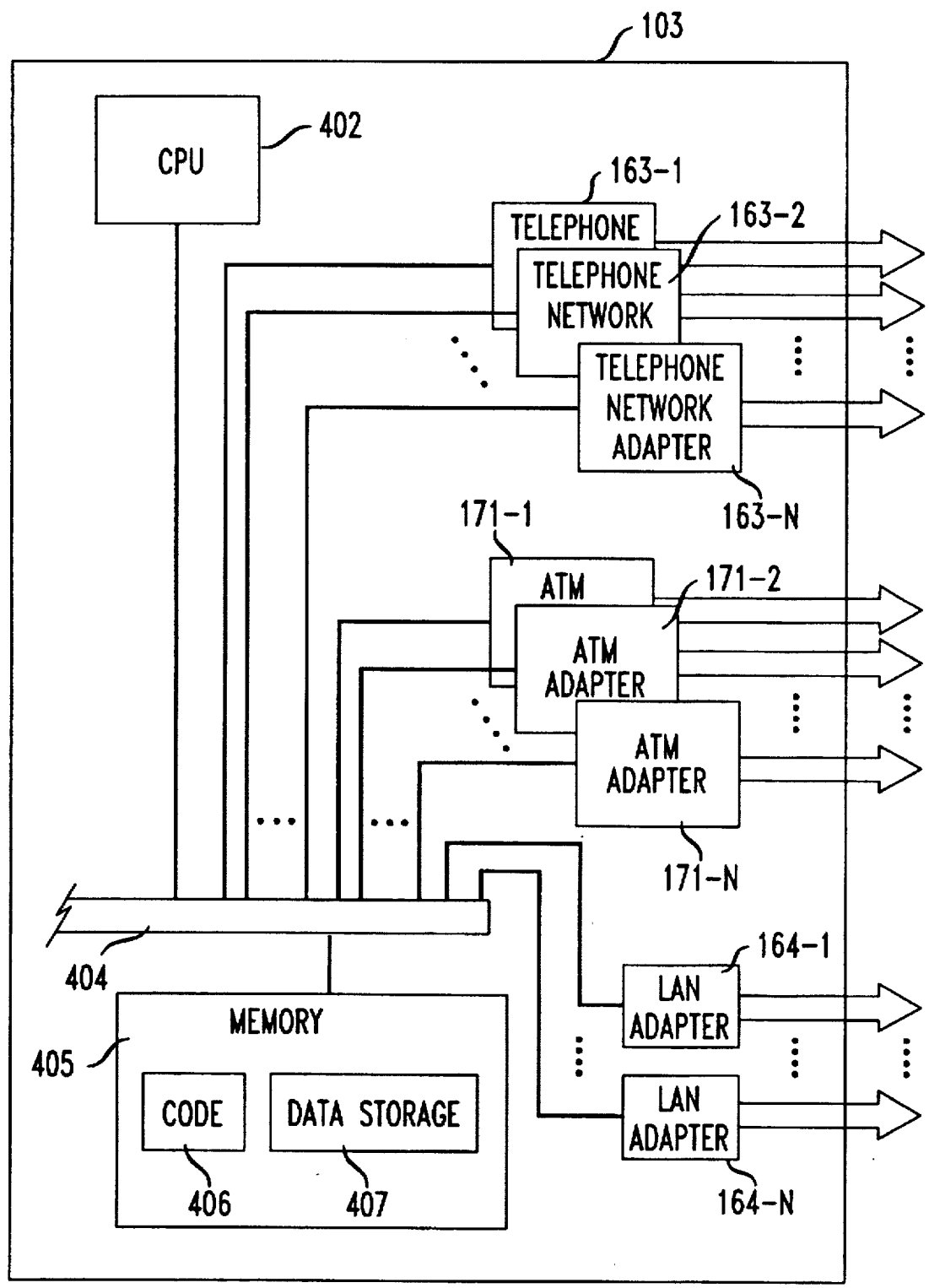
FIG. 4 is an expanded block diagram view of an exemplary embodiment of a RouTel of FIG. 1.

FIG. 4 is an expanded block diagram view of an exemplary embodiment of RouTel 103. RouTel 103 includes a) at least one telephone adapter 163, which may be of various types, such as ISDN BRI, ISDN PRI, and modems, for interconnecting RouTel 103 to telephone network 167, b) at least one ATM adapter 171, for interconnecting RouTel 101 to ATM network 151, c) central processing unit (CPU) 402, d) data bus 404, e) memory 405, which includes program code 406 and data storage 407, and f) optional legacy LAN adapters 164 for directly attaching legacy LAN segments or hosts. Central processing unit (CPU) 402 provides all the computational capability necessary to control the processes of RouTel 101. Bus 404 provides for the exchange of data between the components of RouTel 101. Telephone adapters 163, ATM adapters 171, and legacy LAN adapters 164 each contain, for example, well-known data transceivers. Memory 405 includes 1) code portion 406, which contains the instructions (program) used by CPU 402 to control the processes of RouTel 103, such as those described herein above, and data storage portion 407, which contains the information necessary for RouTel 103 to perform its functions, such as, an address table.

Figure 5:
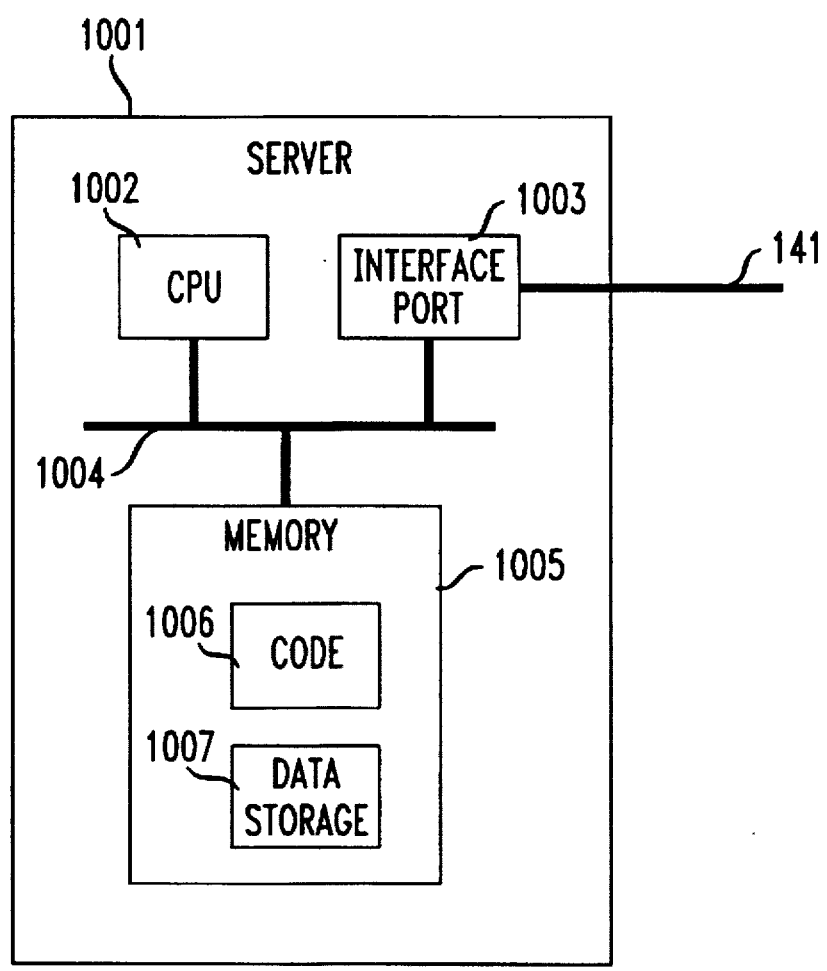
FIG. 5 is a block diagram view of an exemplary embodiment of a generic server, which may serve as the address server, broadcast server or RouTel database of FIG. 1.

FIG. 5 is a block diagram view of an exemplary embodiment of generic server 1001, which may serve as address server 123, broadcast server 125 and RouTel database 105. Each server 1001 includes a) central processing unit (CPU) 1002, b) interface port 1003 c) bus 1004 and d) memory 1005. Central processing unit (CPU) 1002 provides all the computational capability necessary to control the processes of server 1001. Bus 1004 provides for the exchange of data between the components of server 1001. Interface port 1003 provides for the exchange of data between server 1001 and devices external to server 1001. To this end, interface port 1003 contains, for example, well-known data transceivers. Memory 1005 includes 1) code portion 1006, which contains the instructions (program) used by CPU 1002 to control the processes of server 1001, such as those described herein above, and data storage portion 1007, which contains the information necessary to the server to perform its specific function, such as, an address table.

It is noted that any or all of a) address server 123, b) broadcast server 125, and c) RouTel data base 105, may be integrated with each other, or with a RouTel, in any combination.

The foregoing merely illustrates the principles of the invention. It will thus be appreciated that those skilled in the art will be able to devise various arrangements which, although not explicitly described or shown herein, embody the principles of the invention and are thus within its spirit and scope.

What is claimed is:

1. Apparatus for use in establishing connections between a host connected via a telephone link to a telephone network, and a host attached to an asynchronous transfer mode ATM network, the apparatus comprising:

telephone network adapter means for establishing a first data communications session between said apparatus and said host connected to said telephone network, said first data communication session employing a first protocol for carrying a layer-3 packet;

means for determining a layer-3 address for said host connected to said telephone network;

ATM adapter means for establishing a second data communications session between said apparatus and said ATM-attached host, said second data communication session employing a second protocol for carrying a layer-3 packet;

means for translating between said first and second protocols;

means for performing address translation between ATM addresses, telephone numbers, and layer-3 addresses; and means for reading a layer-3 packet header and routing a packet between said telephone network adapter means and said ATM adapter means to connect said host connected to said telephone network with said ATM-attached host, said packet having its address and protocol translated to correspond to that of the host to which it is destined.

2. The invention as defined in claim 1 wherein said telephone network adapter means is a modem terminating an analog telephone line.

3. The invention as defined in claim 1 wherein said telephone network adapter means terminates an integrated services digital network ISDN link.

4. The invention as defined in claim 1 further including means for transmitting said determined layer-3 address to said host connected to said telephone network.

5. The invention as defined in claim 1 further comprising means for transmitting said determined layer-3 address and the telephone number of said host connected to said telephone network to said means for performing address translation.

6. The invention as defined in claim 1 further comprising means for transmitting said determined layer-3 address to a data base external to said apparatus.

7. The invention as defined in claim 1 further comprising means for transmitting status information regarding usage of said telephone network adapter means to a data base external to said apparatus.

8. The invention as defined in claim 1 wherein said apparatus further includes local area network LAN adapter means for establishing a third data communications session between said apparatus and a host connected to a LAN, said third data communication session employing a third protocol for carrying a layer-3 packet; and wherein said means for reading a layer-3 packet header and routing a packet between said telephone network adapter means and ATM adapter means is also for routing a packet between any one of said adapter means other than said LAN adapter means and said LAN adapter means.

9. The invention as defined in claim 8 wherein any of (i) said host connected to said telephone network, (ii) said ATM network attached host, and (iii) said host connected to a LAN can broadcast a packet to the other two hosts.

10. The invention as defined in claim 1 further including means for detecting that said host connected to the telephone network was previously connected to a different apparatus of the same type.

11. The invention as defined in claim 1 further including:

means for identifying that said packet is a multicast or broadcast packet; and means for transmitting said packet when it is identified as a multicast or broadcast packet to a predetermined destination.

12. The invention as defined in claim 11 wherein said predetermined destination is a server for forwarding such an identified multicast or broadcast packet to more than one destination.

13. The invention as defined in claim 1 wherein said means for determining determines a new layer-3 address for assignment to said host connected to said telephone network.

14. The invention as defined in claim 13 further including means for detecting that said host connected to the telephone network was previously connected to a different apparatus of the same type.

15. The invention as defined in claim 14 further including means for activating (i) said means for determining a layer-3 address to determine a new layer-3 address for said host connected to the telephone network and (ii) said means for transmitting said determined layer-3 address and the telephone number of said host connected to said telephone network to said means for performing address translation, to transmit the new layer-3 address and a new telephone number for said host connected to said telephone network, activating by said means for activating being performed in response to detection by said means for detecting of the fact that said host connected to the telephone network was previously connected to a different apparatus of the same type.

16. The invention as defined in claim 13 further including:

means for detecting that said host connected to said telephone number has relocated to a new telephone number; and means for activating said means for transmitting said determined layer-3 address and the telephone number of said host connected to said telephone network to said means for performing address translation, to transmit the layer-3 address and the new telephone number for said host connected to said telephone network, activating by said means for activating being performed in response to detection by said means for detecting of the fact that said host connected to the telephone network has relocated to a new telephone number.

17. A method for connecting a telephone-network-attached host to an asynchronous transfer mode ATM-attached host, the method comprising the steps of:

placing a first telephone call to a data base at a known telephone number;

receiving over said first telephone call the identity of an available telephone adapter on a RouTel;

disconnecting from said first telephone call;

originating a second telephone call to said identified available adapter;

receiving a query for a layer-3 address;

transmitting said telephone-network-attached host's layer-3 address if said telephone network attached host has a layer-3 address;

receiving a layer-3 address if said telephone-network-attached host has no layer-3 address; and transmitting a layer-3 data packet identifying said layer-3 address as the source of said packet.

18. The invention as defined in claim 17 wherein said layer-3 address is transmitted by said telephone-network-attached host as part of the header of a data packet.

19. The invention as defined in claim 17 wherein said layer-3 address is transmitted by said telephone-network-attached host as part of the contents of a packet transmitted in response to said query.

20. A method for use in a RouTel comprising the steps of:

receiving a telephone call from a telephone-network-attached TNA host;

querying said TNA host to determine if said TNA host has a layer-3 address;

assigning a layer-3 address to said host if the result of said determination is that said TNA host does not have a layer-3 address;

receiving a layer-3 data packet;

determining the layer-3 address of the destination of the packet;

determining the corresponding lower layer address or telephone number corresponding to the destination layer-3 address;

converting the encapsulation layer-3 data packet from a first protocol by which the data packet is received to a second protocol suitable for reaching the destination;

establishing a connection to the destination of the packet; and forwarding the layer-3 packet to the destination.

21. A method for use by a RouTel in connecting an asynchronous transfer mode ATM-attached host to a telephone-network-attached host having a layer-3 address, the method comprising the steps of:

receiving, over an ATM connection, a packet from said ATM-attached host;

determining, from the layer-3 address of said packet, that said packet is destined for said TNA host;

retrieving a last known telephone number for said TNA host;

placing a call to said last known telephone number;

establishing a data communication session with said TNA host when said host is still located at said last known telephone number;

translating said packet from the protocol in which it was received to a protocol employed by said TNA host;

transmitting said translated packet to said TNA host over said data communication session.

22. The invention as defined in claim 21 further including the step of locating an available telephone network adapter within said RouTel.

23. The invention as defined in claim 22 further including the step of allocating said located available telephone network adapter for use by said TNA host.

* * * * *